United States Patent [19]
Edwards

[11] Patent Number: 5,848,361
[45] Date of Patent: Dec. 8, 1998

[54] SIGNAL COMBINER FOR A RADIO COMMUNICATION BASE STATION ARRANGEMENT

[75] Inventor: Keith Russell Edwards, Paignton, England

[73] Assignee: Northern Telecom Limited, Montreal, Canada

[21] Appl. No.: 546,575

[22] Filed: Oct. 20, 1995

[30] Foreign Application Priority Data

Oct. 26, 1994 [GB] United Kingdom .................. 9421538

[51] Int. Cl.$^6$ ....................................... H04B 7/08
[52] U.S. Cl. ..................... 455/562; 455/137; 455/276.1; 455/277.2
[58] Field of Search ................................. 455/33.1, 33.3, 455/53.1, 54.1, 56.1, 67.1, 132, 133, 134, 135, 137, 139, 272, 273, 275, 276.1, 277.1, 278.1, 279.1, 422, 507, 517, 522, 561, 562; 342/367, 371, 375; 375/347, 227, 267

[56] References Cited

U.S. PATENT DOCUMENTS

| | | | |
|---|---|---|---|
| 4,278,978 | 7/1981 | Easterling | 455/276.1 |
| 4,856,080 | 8/1989 | Hulkko | 455/276.1 |
| 5,335,010 | 8/1994 | Lindemeier et al. | 455/277.1 |

FOREIGN PATENT DOCUMENTS 404357721  12/1992  Japan .................................. 455/276.1

OTHER PUBLICATIONS

William C.Y. Lee "Mobile Cellular Telecommunications Systems" pp. 382–390, McGraw–Hill Book Company, 1989.

*Primary Examiner*—Thanh Cong Le
*Attorney, Agent, or Firm*—Lee, Mann, Smith, McWilliams, Sweeney & Ohlson

[57] ABSTRACT

This invention relates to radio communication systems and provides a signal combiner for a radio communications system having a number of receiving antennas. The signal combiner receives signals from all receiving antennas and provides a combination technique with performance close to optimal (maximal ratio) combiners but without the complexity. The invention provides a base station (10) arrangement which only processes the outputs from antennas (12) which contribute positively to the overall system carrier-to-noise ratio.

11 Claims, 3 Drawing Sheets

SIGNAL COMBINER FOR A RADIO COMMUNICATION BASE STATION ARRANGEMENT

FIELD OF INVENTION

This invention relates to radio communication systems and in particular relates to a base station arrangement comprising means to combine a number of signals input from receiving antennas.

DESCRIPTION OF RELATED ART

Cellular radio systems are currently in widespread use throughout the world providing telecommunications to mobile users. In order to meet the capacity demand, within the available frequency band allocation, cellular radio systems divide a geographic area to be covered into cells. At the centre of each cell is a base station through which the mobile stations communicate, typically being equipped with antenna arrays arranged in three or six sectored sub-cells where the higher gain of the narrower beamwidth antennas improve the uplink from the lower power mobiles. The distance between the cells is determined such that co-channel interference is maintained at a tolerable level.

Obstacles in a signal path, such as buildings in built-up areas and hills in rural areas, act as signal scatterers and can cause signalling problems. These scattered signals interact and their resultant signal at a receiving antenna is subject to deep and rapid fading and the signal envelope often follows a Rayleigh distribution over short distances, especially in heavily cluttered regions. A receiver moving through this spatially varying field experiences a fading rate which is proportional to its speed and the frequency of the transmission. Since the various components arrive from different directions, there is also a Doppler spread in the received spectrum.

When a new cellular radio system is initially deployed, operators are often interested in maximising the uplink (mobile to base station) and downlink (base station to mobile station) range. The ranges in many systems are uplink limited due to the relatively low transmitted power levels of hand portable mobile stations. Any increase in range means that fewer cells are required to cover a given geographic area, hence reducing the number of base stations and associated infrastructure costs.

The range of the link, either the uplink or the downlink, can be controlled principally in two different ways: by adjusting either the power of the transmitter or the gain at the receiver. On the downlink the most obvious way of increasing the range is to increase the power of the base station transmitter. To balance the link the range of the uplink must also be increased by an equivalent amount. The output power of a transmitter on a mobile, however, is constrained to quite a low level to meet national regulations. National regulations, which vary on a country to country basis set a maximum limit on the effective isotropic radiation power (EIRP) which may be emitted. Accordingly the receive gain at the base station must be increased.

The principal method of improving the receive system gain and to reduce the effect of fading is to include some form of diversity gain in addition to the receive antenna gain. The object of a diverse system is to provide the receiver with more than one path, with the paths being differentiated from each other by some means, e.g. space, angle, frequency or polarisation. The use of these additional paths by the receiver provides the diversity gain. The amount of gain achieved depends upon the type of diversity, number of paths, and method of combination.

There are three distinct types of methods of combining:
(i) Scanning and selection combiners (FIG. 1) wherein only one antenna of a number of antennas is employed and the outputs of the other antennas are discounted.;
(ii) Equal gain combiners, (see FIG. 2) wherein the signals from all the antennas are summed and amplified by an equal extent; and
(iii) Maximal ratio combiners, (see FIG. 3) wherein each signal is weighted in proportion to its signal to noise ratio (SNR) before summation.

The simplest of the combination techniques is the basic switch diversity system having two antennas: each of the received paths is analysed and the best received signal is employed. If the signals are uncorrelated then when one is in a fade, the other has a high probability of not being in a fade. Therefore in a BPSK system it can be possible to achieve up to 3 dB of diversity gain, at 5% BER, by selecting the best available output. Where a number of antennas are present, the method of choosing the particular antenna is determined upon whether (a) the output signal from an antenna has the best signal-to-noise ratio (SNR); or (b) in scanning, the output signals from the antennas are sequentially tested and the first signal which is greater than a preset threshold is selected as an acceptable signal—this signal is therefore not necessarily the best, but is employed until it drops below the threshold, when the scanning procedure is restarted;

With "co-phasal" or "equal gain diversity", as its name implies the output is simply the sum of all inputs with equal weight irrespective of the input SNR.

Maximal ratio combining produces the best distribution curves of these diversity systems, but still uses multistage processors to calculate algorithms which adjust the weight of each path before combining all of the available paths. For a BPSK system using four branch optimal combining, it should be possible to achieve at least 6 dB of diversity gain without fading (simply due to the increased antenna aperture of 10 log 4) and in a Rayleigh fading environment with zero signal correlation and 5% BER, diversity gains up to 10 dB are available.

The improvements in SNR obtainable from the three techniques are (in order of best to worst): maximal ratio, co-phasal and basic switch diversity (or selection), but due to the complexity and cost of a maximal ratio combining arrangement, less complex combining schemes are often deployed.

This invention is concerned with the combination techniques of spatially diverse systems and in particular seeks to provide a combination technique with performance close to optimal (maximal ratio) combiners but without the complexity.

SUMMARY OF INVENTION

According to the present invention there is provided a base station arrangement comprising a plurality of antennas, signal processing means, switching means and an output, wherein the antennas are operable to receive a signal from a signal source; wherein, in use, the carrier to noise ratio is determined by the signal processing means for the antenna receiving the strongest signal from the signal source and that the strongest received signal is switched from the signal processing means to the output; wherein the carrier to noise ratio is also determined by the signal processing means for the signals received by the other antennas, wherein those signals received by the other antennas which contribute positively to the overall system carrier to noise ratio are also switched from the signal processing means to the output. Preferably the carrier to noise ratio is determined for the signals received by the other antennas sequentially in order of their signal strength. Preferably, the arrangement further comprises phase correctors whereby the outputs from those antennas which contribute positively to the output of the arrangement are switched in phase.

In a preferred embodiment, the antenna which has the largest carrier to noise ratio is switched first and subsequent antenna are switched through to the output, providing the following condition is satisfied:

$$CNR_{N+1} \geq <\sqrt{N+1} - \sqrt{N}>^2 CNR_N$$

where
N=number of channels in previous CNR calculation, and;
$CNR_N$=previously calculated carrier-to-noise ratio.
The carrier-to-noise ratio in the algorithm could be replaced by the carrier-to-noise plus interference ratio (CNIR).

In another aspect of the invention there is provided a method of operating a base station arrangement comprising a plurality of antennas, signal processing means, switching means and an output, wherein the antennas are operable to receive a signal from a signal source; wherein the method comprises the steps of; determining the carrier to noise ratio by the signal processing means for the strongest received signal from the signal source; switching the signal to the output; determining the carrier to noise ratio for the signals received by the other antennas, and; switching to the output those outputs from each antenna which contribute positively to the overall system carrier to noise ratio.

In a still further aspect, there is provided method of operating a base station arrangement comprising a plurality of antennas, signal processing means, switching means, phase rotation means and an output, wherein the antennas are operable to receive a signal from a signal source; the method comprising the steps of:
(i) selecting the output from the antenna having the strongest received signal and determining the carrier to noise ratio for this received signal with the signal processing means;
(ii) switching the antenna providing this selected signal to the output;
(iii) selecting the antenna having the next strongest received signal and determining the carrier to noise ratio for this received signal with the signal processing means;
(iv) determining whether the overall carrier to noise ratio would be improved if this signal was combined at the output with the signal processing means;
(v) switching the antenna providing this next selected signal to the output after rotating the phase of this signal until this signal is in phase with the strongest signal if the addition of this signal to the output improves the overall carrier to noise ratio; and
(vi) repeating steps (iii) through (v) for the signals received from the other antennas until: the first to occur of a) the selected antenna does not have a sufficiently strong output, or b) no further antenna is available.

Preferably, the output from the next antenna is selected provided that the following algorithm is satisfied:

$$CNR_{N+1} \geq <\sqrt{N+1} - \sqrt{N}>^2 CNR_N$$

(where: N=number of channels in previous CNR calculation; and $CNR_N$=previously calculated carrier-to-noise ratio) The carrier-to-noise ratio in the algorithm could be replaced with the carrier-to-noise plus interference ratio (CNIR).

BRIEF DESCRIPTION OF THE DRAWINGS

Reference will now be made to the accompanying drawings wherein.

DESCRIPTION OF THE PREFERRED EMBODIMENT

Figure 1:
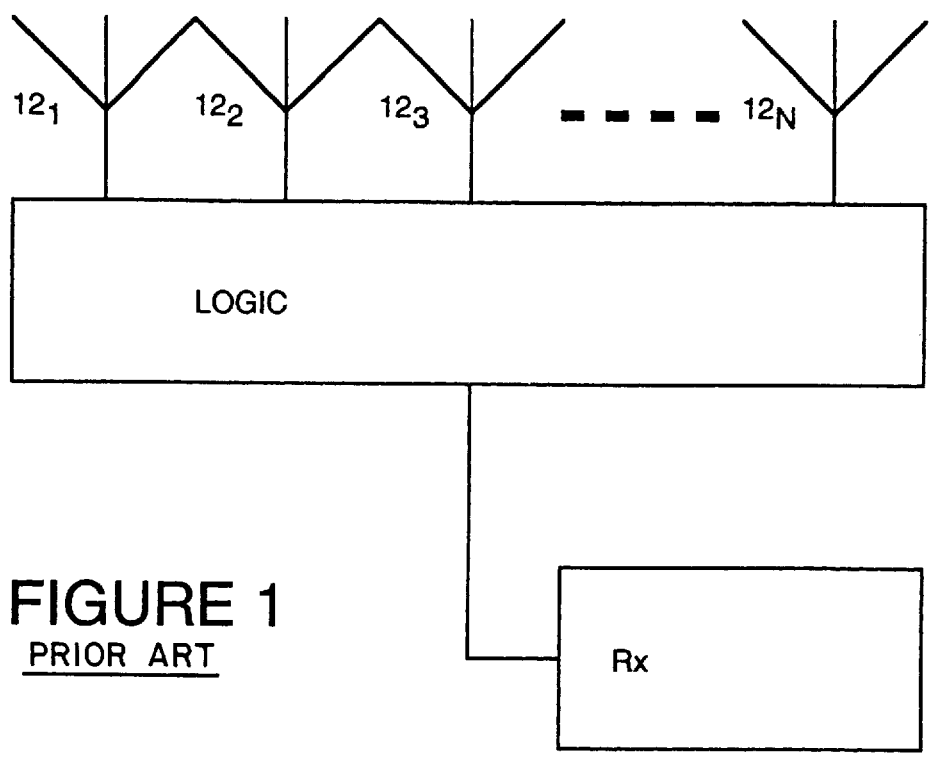
FIG. 1 is a schematic representation of a scanning/selection combiner.
Figure 2:
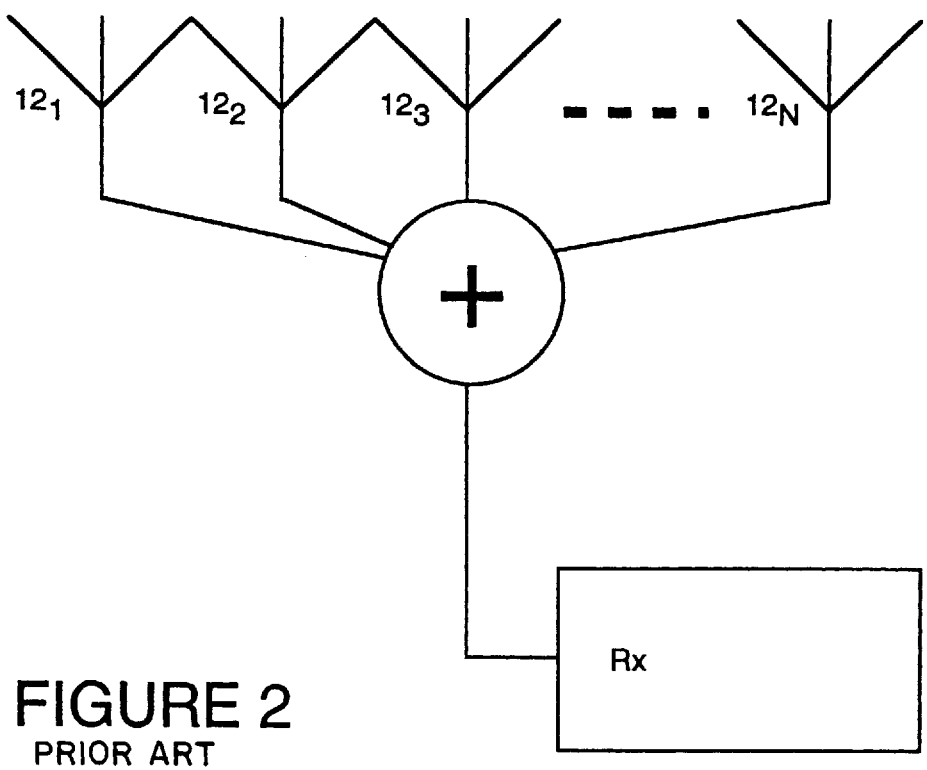
FIG. 2 shows a schematic representation of an equal gain combiner.
Figure 3:
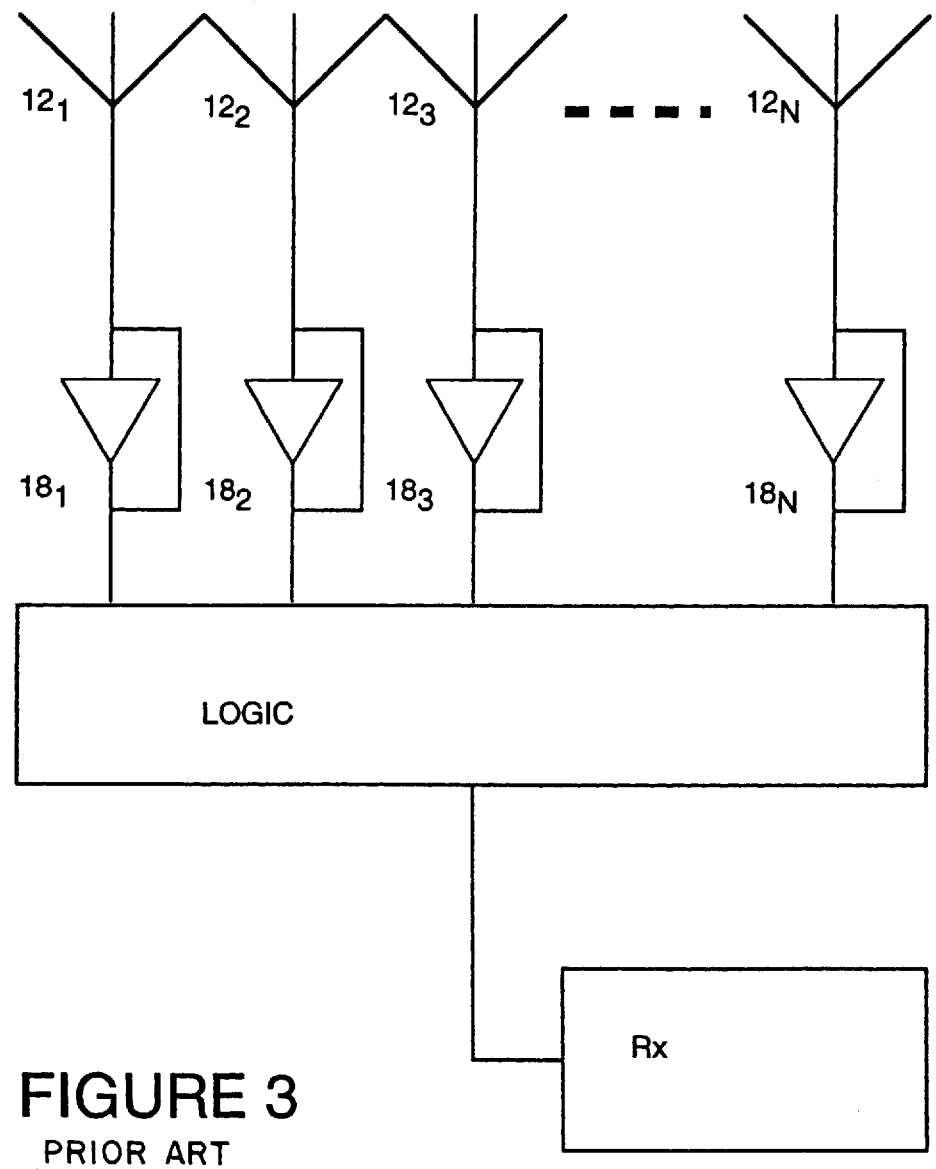
FIG. 3 shows a schematic representation of a maximal ratio combiner.
Figure 4:
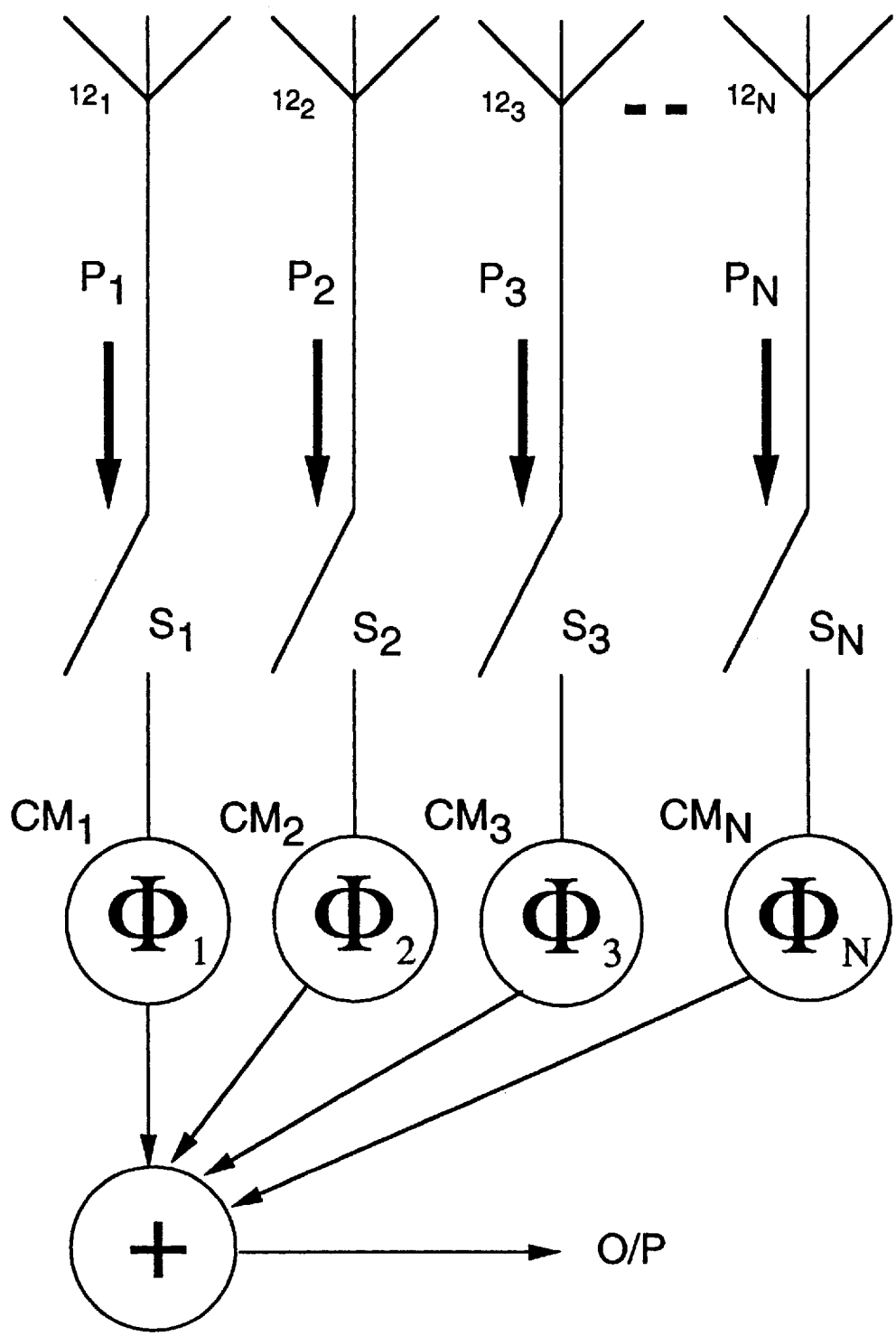
FIG. 4 shows a schematic representation of a base station arrangement made in accordance with the invention.

Referring to FIG. 4, each of the inputs from the antenna $12_i$ (where i equals 1 to N, and N=the number of channels present) is comprised of a signal power $P_i$ and a noise level $\sigma_i^2$ These figures can be determined by, for instance, the channel estimator in a multi-channel GSM receiver. Phased compensation means $CM_i$ add phase weights $\Phi_1$ to bring the signal components into coherence.

Considering the simplified case where the noise level in each of the channels is assumed to be equal, the output carrier to noise ratio $CNR_{out}$ can be expressed as follows:

$$CNR_{out} = \frac{\left\langle \sum_{i=1}^{N} \sqrt{P_i} \right\rangle^2}{N\sigma_i^2}$$

The addition of an extra channel will either improve or degrade $CNR_{out}$ depending upon the value of the new channel's CNR relative to that previously calculated CNR. For coherent signal channels, it can be shown that:

$$CNR_{new(N+1)} \geq <\sqrt{N+1} - \sqrt{N}>^2 CNR_{old(N)}$$

or, in decibels;

$$CNR_{new}(dB) \geq CNR_{old}(dB) - 20\log<\sqrt{N+1} - \sqrt{N}>$$

The system shown in FIG. 4 operates by selecting the strongest signal and closing its switch $S_i$ before selecting the next strongest and calculating its CNR. If the CNR of the next strongest antenna input signal is stronger than −7.6 dB (i.e. $10\log(\sqrt{2}-\sqrt{1})^2$) below the CNR of the first antenna, then the switch for this channel and its phased weight is rotated to make it coherent with the stronger signal. This process is repeated for the other channels with a decision criteria reducing from 7.6 dB to −9.9 dB for the third channel and then to −11.4 dB for the fourth channel, each time with reference to the total CNR immediately prior to the addition of the new channel. Of course, the carrier-to-noise ratio may, in fact, be the carrier-to-noise plus interference ratio.

The same result can be achieved by using the relative signal amplitudes in the decision process as shown by the following algorithm:

$$\frac{\sum_{1}^{K} a_i}{\sum_{1}^{K-1} a_i} < \left(\frac{K}{K-1}\right)^{1/2}$$

where: $a_i$ is the signal amplitude of a single channel and K represents the total number of channels.

It is to be understood that the determination of which antenna should be employed is a continuous process; the method is repeated in order to overcome interference or differing propagation circumstances in the transmission paths, for instance if the signal source is a mobile radio user moving with respect to the base station.

One particularly useful advantage of this invention is that it can achieve gain margins close to an optimal combiner but with a reduced complexity. This reduction in complexity may allow high order diversity schemes (4 or higher) to be considered where previously they had been considered uneconomic.

I claim:

1. A base station arrangement comprising a plurality of antennas, signal processing means, switching means and an output, wherein the antennas are operable to receive a signal from a signal source; wherein, in use, the carrier to noise ratio is determined by the signal processing means for the antenna receiving the strongest signal from the signal source and the strongest received signal is switched from the signal processing means to the output;

wherein the carrier to noise ratio is also determined by the signal processing means for the signals received by the other antennas; and, wherein the subsequent antennas are individually switched through to the output, providing the following condition is satisfied:

$$CNR_{N+1} \geq < \sqrt[2]{N+1} - \sqrt{N} >^2 CNR_N$$

wherein N=number of channels in previous CNR calculation; and $CNR_N$=previously carrier-to-noise ratio.

2. An arrangement according to claim 1 further comprising phase correctors whereby the outputs from those antennas which contribute positively to the output of the arrangement are switched in phase.

3. An arrangement according to claims 1, wherein the carrier-to-noise ratio is the carrier-to-noise plus interference ratio (CNIR).

4. A base station arrangement comprising a plurality of antennas, signal processing means, switching means and an output, wherein the antennas are operable to receive a signal from a signal source; wherein, in use, the carrier to noise ratio is determined by the signal processing means for the antenna receiving the strongest signal from the signal source and the strongest received signal is switched from the signal processing means to the output; wherein the carrier to noise ratio is also determined by the signal processing means for the signals received by the other antennas, wherein a subset of those signals received by the other antennas which contributes positively to the overall system carrier to noise ratio is also individually switched by the signal processing means to the output wherein the carrier to noise ratio is determined for the signals received by the other antennas sequentially in order of their signal strength.

5. An arrangement according to claim 4 further comprising phase correctors whereby the outputs from those antennas which contribute positively to the output of the arrangement are switched in phase.

6. An arrangement according to claim 4, wherein the carrier-to-noise ratio is the carrier-to-noise plus interference ratio (CNIR).

7. A method of operating a base station arrangement comprising a plurality of antennas, signal processing means, switching means, phase rotation means and an output, wherein the antennas are operable to receive a signal from a signal source; the method comprising the steps of:

(i) selecting the output from the antenna having the strongest received signal and determining the carrier to noise ratio for this received signal with the signal processing means;

(ii) switching the antenna providing this selected signal to the output;

(iii) selecting the antenna having the next strongest received signal with the signal processing means;

(iv) determining whether the overall carrier to noise ratio would be improved if this signal was combined at the output with the signal processing means;

(v) switching the antenna providing this next selected signal to the output after rotating the phase of this signal until this signal is in phase with the strongest signal if the addition of this signal is in phase with the strongest signal if the addition of this signal to the output improves the overall carrier to noise ratio; and (vi) repeating steps (iii) through (v) for the signals received from the other antennas until: the first to occur of a) the selected antenna does not have a sufficiently strong output, or b) no further antenna is available.

8. A method of operating a base station arrangement according to claim 7 wherein the output from the next antenna is selected provided that the following algorithm is satisfied:

$$CNR_{N+1} \geq < \sqrt[2]{N+1} - \sqrt{N} >^2 CNR_N$$

where: N=number of channels in previous CNR calculation; and CNRN=previously calculated carrier-to-noise ratio.

9. A method according to claim 7 wherein the carrier-to-noise ratio is the carrier-to-noise plus interference ratio (CNIR).

10. A method of operating a base station arrangement comprising a plurality of antennas, signal processing means, switching means and an output, wherein the antennas are operable to receive a signal from a signal source; wherein the method comprises the steps of;

determining the carrier to noise ratio by the signal processing means for the strongest received signal from the signal source;

switching the strongest received signal to the output;

determining the carrier to noise ratio for the signals received by the other antennas, and;

switching to the output those outputs from each antenna which contribute positively to the overall system carrier to noise ratio; and wherein the output from the next antenna is individually located provided that the following algorithm is satisfied:

$$CNR_{N+1} \geq < \sqrt[2]{N+1} - \sqrt{N} >^2 CNR_N$$

where: N=number of channels in previous CNR calculation; and CNRN=previously calculated carrier-to-noise ratio.

11. A method according to claim 10 wherein the carrier-to-noise ratio is the carrier-to-noise interference ration (CNIR).

\* \* \* \* \*